April 25, 1939.  F. L. MAIN  2,155,672
BRAKE MECHANISM
Filed July 6, 1936  3 Sheets-Sheet 1
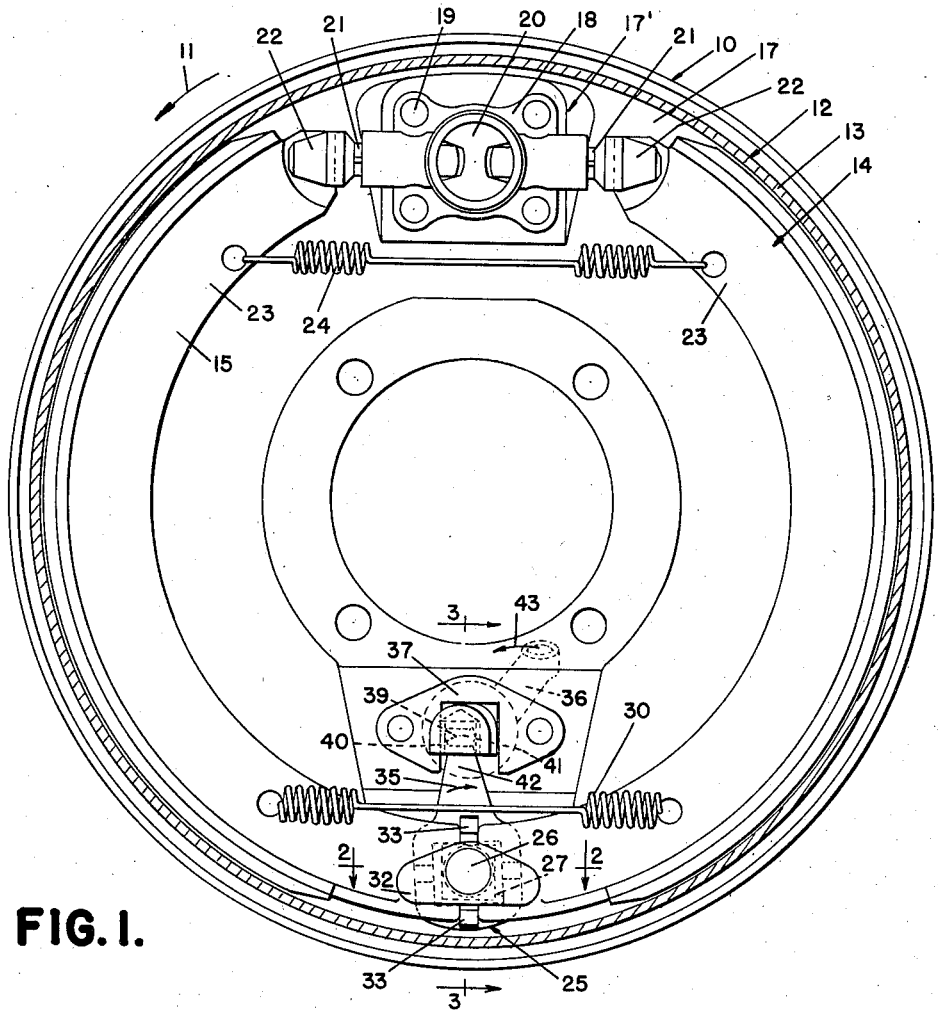
FIG. I.
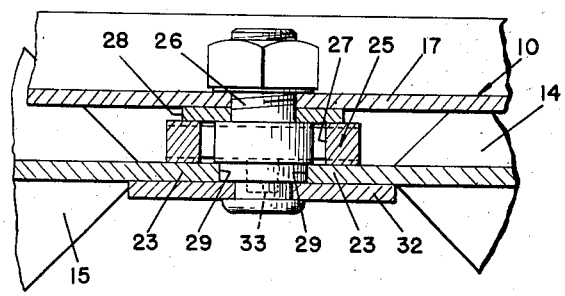
FIG. 2.
INVENTOR
FRANK L. MAIN
BY
ATTORNEYS April 25, 1939.  F. L. MAIN  2,155,672
BRAKE MECHANISM
Filed July 6, 1936  3 Sheets-Sheet 2
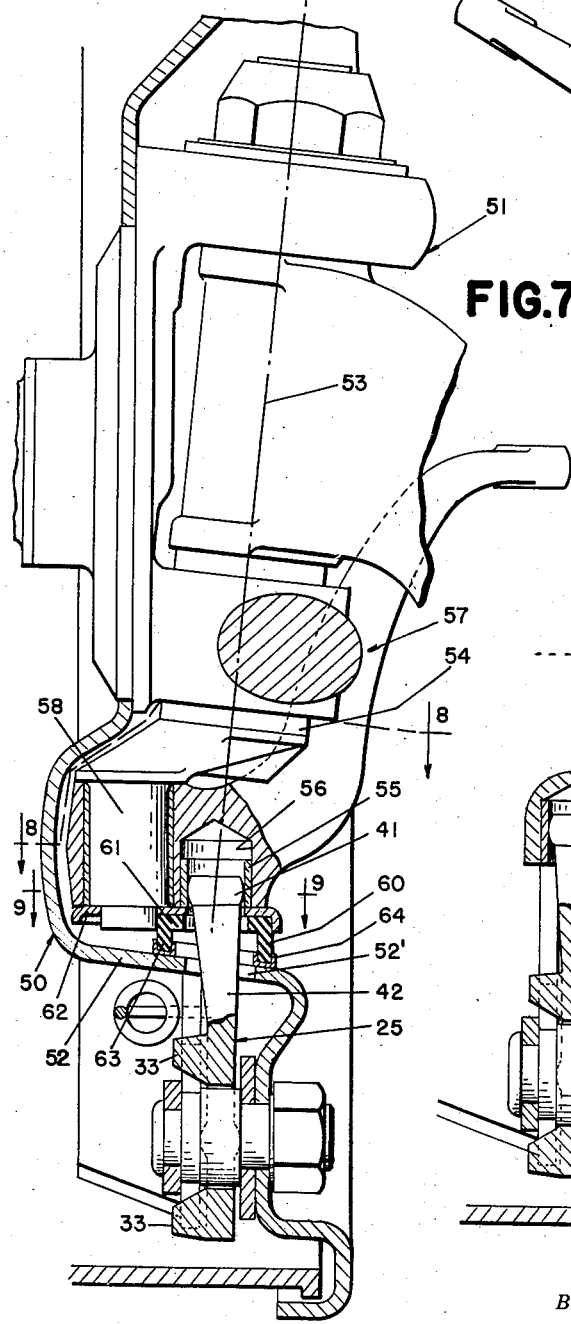
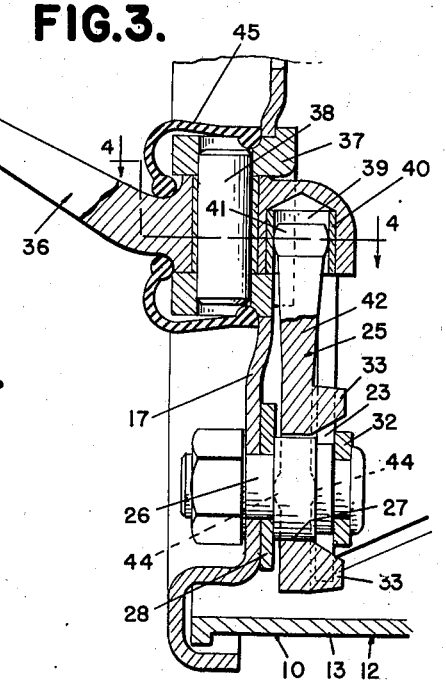
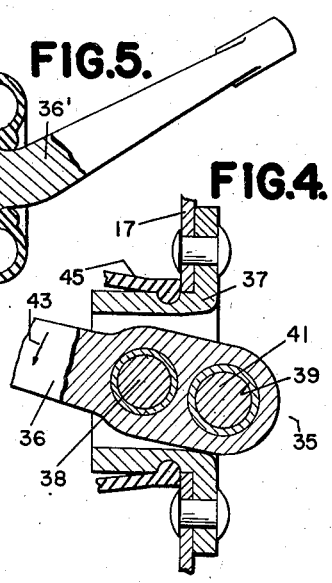
INVENTOR
FRANK L. MAIN
BY Whittemore Hulbert & Belknap,
ATTORNEYS April 25, 1939.   F. L. MAIN   2,155,672
BRAKE MECHANISM
Filed July 6, 1936   3 Sheets-Sheet 3

INVENTOR
FRANK L. MAIN
BY
ATTORNEYS

Patented Apr. 25, 1939

2,155,672

UNITED STATES PATENT OFFICE 2,155,672

BRAKE MECHANISM

Frank L. Main, Birmingham, Mich., assignor to Kelsey-Hayes Wheel Company, Detroit, Mich., a corporation of Delaware Application July 6, 1936, Serial No. 89,192

13 Claims. (Cl. 188—78)

This invention relates generally to vehicle wheel brakes and refers more particularly to improvements in the brake actuating means.

One of the principal objects of the present invention resides in the provision of an actuator for the brake friction means capable of being employed in any one of the vehicle brakes irrespective of the end or side of the vehicle the brakes are to be installed.

Another advantageous feature of the present invention resides in the provision of an actuator of the type set forth in the form of a cam located between the circumferentially spaced ends of the friction means and rockable across a radial plane including the axis of rotation of the brake drum for moving the friction means into engagement with the brake flange.

A further object of the present invention consists in the provision of a cam effective upon rocking the same in one direction to move the toe of the primary shoe into engagement with the brake flange, and to lift the secondary shoe into frictional engagement with the brake flange. Lifting of the secondary shoe into engagement with the brake flange causes the anchor end of the shoe to move into engagement with the flange before any other part of the shoe or, in other words, effects a wrapping of the secondary shoe into engagement with the brake flange in the direction of rotation of the brake drum. This is desirable in that it appreciably increases the braking torque of the secondary shoe and provides for obtaining greater braking efficiency.

The foregoing, as well as other objects, will be made more apparent as this description proceeds, especially when considered in connection with the accompanying drawings, wherein:

Figure 1 is an elevation partly in section of a left-hand rear brake illustrating my improved actuating mechanism;

Figure 2 is a sectional view taken substantially on the plane indicated by the line 2—2 of Figure 1;

Figure 3 is a sectional view taken substantially on the plane indicated by the line 3—3 of Figure 1;

Figure 4 is a cross sectional view taken substantially on the plane indicated by the line 4—4 of Figure 3;

Figure 5 is a view similar to Figure 3 showing a right-hand brake construction;

Figure 7 is a sectional elevational view of the construction illustrated in Figure 6;

Figures 6, 8, 9:
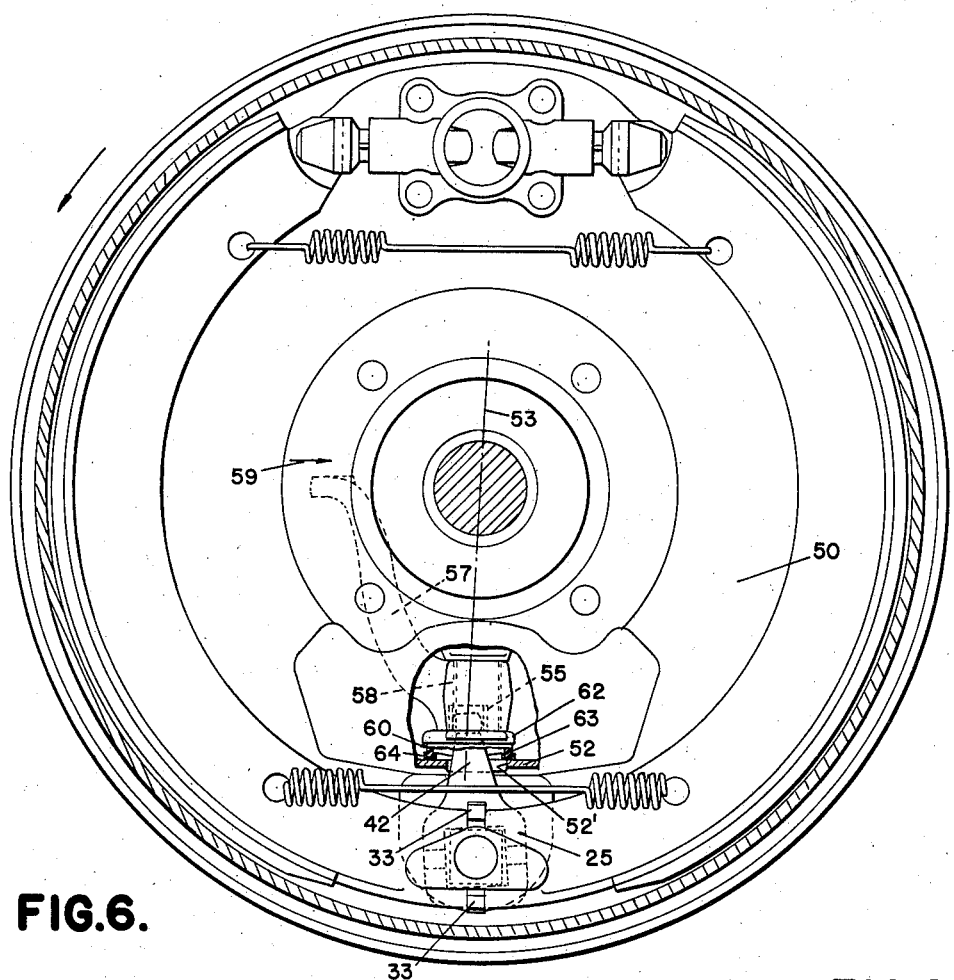
Figure 6 is an elevation partly in section of a left-hand front brake construction.
Figure 8 is a sectional view taken substantially on the plane indicated by the line 8—8 of Figure 7.
Figure 9 is a cross sectional view taken substantially on the plane indicated by the line 9—9 of Figure 7.

Referring now more in detail to the drawings, it will be noted that I have illustrated in Figures 1 to 4, inclusive, a brake 10 adapted to be applied to a rear left-hand vehicle wheel and having a forward rotative movement in the direction of the arrow 11 shown in Figure 1. The brake 10 is shown in Figures 1 to 4, inclusive, as comprising a brake drum 12 and brake friction means located within the drum for engagement with the inner surface of the annular brake flange 13. In the present instance, the brake friction means comprises a primary shoe 14 and a secondary shoe 15. Both of the shoes are T-shaped in cross section and have the opposite ends thereof spaced from each other circumferentially of the brake drum.

In the illustrated embodiment of the invention, the upper ends of the shoes are anchored to the backing plate 17 by means of an adjustment device 17' having a bracket 18 fixedly secured to the backing plate 17 between the upper ends of the shoes by means of the fastener elements 19. The bracket 18 supports an axially movable wedge 20 having the opposed inclined surfaces thereof operatively connected to the upper ends of the shoes by means of adjustment links 21 slidably supported in the bracket for movement at right angles to the axis of the wedge and having slotted head portions 22 at the outer ends thereof for receiving the upper extremities of the web portions 23 of the shoes. The slots in the head portions 22 of the adjustment links slidably receive the upper extremities of the shoes to permit radial shifting movement of the shoes relative to the links, and the upper ends of the web portions of the shoes are maintained in the slots by means of the retraction spring 24 interconnecting the upper end portions of the shoes. In accordance with conventional practice, axial movement of the wedge 20 to adjust the position of the shoes relative to the brake flange, is accomplished from a position exteriorly of the brake drum by means not shown herein, since it forms no part of the present invention.

The actuating means for the brake shoes is associated with the lower ends of the shoes and comprises a cam 25 rockably supported on a shouldered stud 26 fixed to the backing plate 17. Upon reference to Figure 2, it will be noted that the cam 25 is provided with an enlarged opening 27 therethrough loosely receiving the stud 26, and is located between the lower extensions of the web 23 of the brake shoes and a washer 28 fixed to the backing plate by means of the stud 26. It will also be apparent from the above figure that the lower extensions of the webs 23 of the brake shoes are recessed, as at 29, for abutting engagement with the stud 26 in the released position of the brake. The lower ends of the shoes are urged into engagement with the stud by means of a retracting spring 30, and axial displacement of the lower ends of the shoes in a direction away from the cam 25 is prevented by means of a plate 32 fixed to the shouldered stud 26 in a position to engage the front sides of the extensions of the brake shoe webs 23.

It has previously been stated that the actuating means in the present instance moves the toe to the primary shoe outwardly into engagement with the brake flange, and lifts the anchor end of the secondary shoe into engagement with the flange, so as to effect a wrapping of this shoe in the direction of rotation of the brake drum. The foregoing is accomplished in the present instance by providing projections 33 on the cam 25 at diametrically opposite sides of the stud 26. It will be observed from Figure 3 that the projections 33 extend between the lower extremities of the webs 23 of the brake shoes and are arranged at the radially inner and radially outer sides of the stud 26. It follows, therefore, that when the cam 25 is rocked in the direction of the arrow 35 shown in Figure 1, the radially inner projection 33 moves the actuator end of the primary shoe outwardly into engagement with the brake flange 13, and the opposed projection 33 lifts the secondary shoe to engage the adjustment or anchor end of this shoe into engagement with the brake flange. As pointed out above, this action causes the secondary shoe to wrap into engagement with the brake flange of the drum in the direction of rotation of the latter, and thereby greatly increases the effectiveness of the secondary shoe.

It will be observed from the foregoing that the cam 25 is rocked across a radial plane including the axis of rotation of the drum and, for accomplishing this result, I provide a lever 36 supported by the backing plate 17 for rocking movement upon an axis extending at right angles to the axis of rotation of the brake drum. In Figure 3 of the drawings, it will be noted that the forward end of the lever 36 extends into the brake drum through a bushing 37 fixed to the backing plate 17 and carrying a pin 38. The pin 38 extends transversely through the bushing 37 with its axis extending radially from the axis of rotation of the drum, and passes through the lever 36 intermediate the ends of the latter to provide for the desired swinging movement of the lever. The end of the lever 36 within the brake drum is formed with a downwardly opening socket 39 therein lined with a bushing 40 of sufficient diameter to slidably receive the spherically shaped head 41 formed on the radially inner end of the shank 42 on the cam 25.

With the above construction, it will be noted that swinging movement of the lever 36 in the direction of the arrow 43 in Figure 1, effects a rocking movement of the cam 25 in the direction of the arrow 35 to move the brake shoes into frictional engagement with the brake flange 13, in the manner hereinbefore stated. In this connection, it will be noted that the friction offered to rocking of the cam is minimized by reducing the area of contact of opposite sides of the cam with the washers 28 and the lower extensions of the web portions 23 of the brake shoes. This is accomplished herein by forming transverse ribs 44 of arcuate cross section on opposite sides of the cam and at diametrically opposite sides of the stud 26 for engagement with the washer 28 and web portions 23 of the brake shoes.

Provision is made herein for preventing the entrance of foreign matter and grease into the brake drum in the region of the operating lever 36. This is accomplished in the present instance by providing a flexible cover 45 adapted to extend over the rear end of the lever 36 and to enclose the pin 38 and portion of the bushing 37 at the exterior side of the backing plate.

In Figure 5 of the drawings, I have shown a right-hand rear brake construction embodying the principle of this invention. The actual brake mechanism employed in Figure 5 is identical to the brake mechanism previously described, with the exception of the operating lever 36'. This operating lever differs from the one shown in Figures 1 to 4, inclusive, in that the rear-end portion thereof is bent in the reverse direction, so as to assume the proper relationship with the lever 36 when assembled on the right-hand wheel of the vehicle. In other words, all of the parts of the brake mechanism shown in Figure 5, with the exception of the lever 36', may be interchanged with the corresponding parts of the brake mechanism shown in Figures 1 to 4, inclusive, and accordingly, assembly is not only simplified, but the cost of manufacture is appreciably reduced.

In Figures 6 to 9, inclusive, I have shown my improved brake mechanism in association with a left-hand front wheel brake. With the exception of the configuration of the backing plate and the means for rocking the shoe actuating cam, the brake mechanism shown in Figures 6 to 9, inclusive, may be identical to the one illustrated in Figures 1 to 5, inclusive. Accordingly, it is believed unnecessary to duplicate the description of the brake mechanism shown in Figures 1 to 5, inclusive, and the following definition of the parts of brake mechanism shown in Figures 6 to 9, inclusive, will be limited to the parts which are not referred to above. As shown in Figure 7, the backing plate 50 for the brake drum is formed or cupped to partially receive the steering knuckle 51 of the front wheel, and the axially extending flange portion 52 of the backing plate is slotted, as at 52', to permit the shank 42 of the cam 25 to extend through the plate. The center of the spherically shaped head portion 41 at the radially inner end of the shank 42 intersects the axis 53 of the kingpin 54, and is slidably received in a bushing 55 secured in a downwardly opening socket 56 formed in the actuating lever 57 intermediate the ends of the latter. Upon reference to Figure 7, it will be noted that the socket 56 is formed in an axially forwardly extending portion of the lever 57, and the extreme forward end of this lever is pivotally supported on a journal 58 carried by the kingpin 54. The journal 58 is offset forwardly from the lower end of the kingpin 54, and the axis of the same extends radially from the axis of rotation of the brake drum. With this construction, it will be observed that rocking movement of the lever 57 in the direction of the arrow 59 in Figure 6, effects a corresponding rocking movement of the cam 25 in the same direction, with the result that the radially inner projection 33 on the cam 25 moves the toe of the primary shoe outwardly into engagement with the drum, and the outer projection 33 lifts the anchor end of the secondary shoe into engagement with the brake flange of the drum. In other words, the principle of brake application is identical to the one described in detail in connection with the embodiment of the invention illustrated in Figures 1 to 5, inclusive.

In the present instance, foreign matter is prevented from entering the brake drum through the opening 52' by means of a seal 60 having a base portion 61 secured within a retainer plate 62 and having a continuous downwardly extending marginal flange 63 surrounding the opening 52'. It will be apparent from Figure 3 that the continuous marginal flange 63 is maintained in place by means of a retainer 64 substantially channel shaped in cross section for receiving the lower edges of the marginal flanges 63, and secured to the portion 52 of the backing plate.

A right-hand front brake constructed in accordance with this invention is not shown herein, since it is believed apparent from the foregoing that this brake could be the same in construction to the one illustrated in Figures 6 to 9, inclusive, with the exception of the operating lever 57. In order to secure the proper relationship of the operating lever for the brake on the right-hand front vehicle wheel, it is necessary that this lever be bent in a direction opposite to the one shown in Figure 8. It follows, therefore, that my improved brake mechanism renders it possible to employ a cam of one construction for either the front or rear brakes of a vehicle and, as stated above, this arrangement is advantageous, since it reduces the cost of manufacture and facilitates assembly.

What I claim as my invention is:

1. In a brake mechanism, a brake drum, a backing plate for the drum, brake friction means having spaced ends and located within the drum for shifting movement circumferentially of the drum and for radially outward movement into engagement therewith, an abutment extending axially of the drum between the ends of the friction means, a cam mounted on the abutment for rocking movement in a plane substantially parallel to the plane of rotation of the drum and for limited shifting movement with the friction means relative to the abutment, means on the cam engageable with the ends of the friction means, and an operating lever rockably supported intermediate the ends thereof on the backing plate exteriorly of the drum for swinging movement about an axis extending radially from the axis of rotation of the drum and having a socket at one end for receiving a portion of the cam.

2. In a brake mechanism, a brake drum, a backing plate for the brake drum, brake friction means having spaced ends and supported within the drum for limited shifting movement circumferentially of the drum and for radially outward movement into engagement therewith, an abutment extending axially from the backing plate between the ends of the friction means, a cam having an opening therethrough loosely receiving said abutment and rockable in a plane substantially parallel to the plane of rotation of the drum, means on the cam engageable with the ends of the friction means, said cam further having a radially inwardly projecting extension provided with a head movable across a radial plane including the axis of rotation of the drum to effect a rocking movement of the cam, and means engageable with said head for moving the same including an operating lever rockably mounted intermediate the ends thereof on the backing plate for swinging movement about an axis extending radially from the axis of rotation of the drum and having a socket at one end slidably engaging the head on the extension of said cam.

3. In a brake mechanism, a brake drum supported for swivel movement about an up and down axis, brake friction means having spaced ends and located within the brake drum for engagement therewith, a cam mounted within the brake drum for rocking movement in a plane substantially parallel to the plane of rotation of the brake drum and also mounted for shifting movement circumferentially of the drum with the friction means, means carried by the cam and extending between the ends of said friction means for engagement therewith, said cam further having a radially inwardly projecting extension having the inner end located on the axis of swivel movement of the brake drum, and means engageable with said end of the extension for rocking the cam.

4. In a brake mechanism, a brake drum supported for swivel movement about an up and down axis, brake friction means having spaced ends and located within the brake drum for engagement therewith, a cam supported within the brake drum and having portions extending between the ends of the friction means for engagement with said ends, means mounting the cam within said drum for rocking movement in a plane substantially parallel to the plane of rotation of the brake drum and for limited shifting movement circumferentially of the drum with said friction means, said cam further having a radially inwardly projecting extension having the inner end located on the axis of swivel movement of the brake drum, and an operating lever having a portion supported for rocking movement about an axis offset from the axis of swivel movement of the drum and having another portion engaging the end of said extension for rocking the cam upon swinging said lever about its axis.

5. In a brake mechanism, a brake drum supported for swivel movement about an up and down axis, brake friction means having spaced ends and located within the brake drum for engagement therewith, a cam mounted within the brake drum for rocking movement about an axis substantially parallel to the axis of rotation of the brake drum and having portions extending between the ends of said friction means for engagement therewith, said cam further having a radially inwardly projecting extension having the inner end located on the axis of swivel movement of the brake drum, and an operating lever having one end supported for rocking movement about an axis extending radially from the axis of rotation of the drum and having a socket intermediate the ends receiving the end of the extension on said cam to rock the latter upon swinging movement of said lever.

6. In a brake mechanism, a brake drum, a kingpin supporting the brake drum for swivel movement about an up and down axis and having a portion at the lower end offset laterally with respect to said axis, brake friction means having spaced ends and located within the drum for engagement therewith, a cam mounted within the drum for rocking movement about an axis substantially parallel to the axis of rotation of the brake drum and having portions extending between the ends of the friction means for engagement with said ends, said cam further provided with a radially inwardly projecting extension having the inner end located on the axis of swivel movement of the brake drum, and an operating lever having one end supported for rocking movement on the offset portion of the kingpin and having an intermediate portion engageable with the end of said extension to rock the cam upon swinging movement of said lever.

7. In a brake mechanism, a brake drum, a kingpin supporting the brake drum for swivel movement about an up and down axis, said kingpin having a journal at the lower end located with the axis thereof extending radially from the axis of rotation of the drum and laterally offset with respect to the axis of the kingpin, brake shoes located within the drum and having spaced ends, a cam mounted within the brake drum for rocking movement about an axis substantially parallel to the axis of rotation of the brake drum and having portions extending between the ends of the friction means on diametrically opposite sides of the axis of rocking movement of the cam for engagement with said ends, said cam further provided with a radially inwardly projecting extension having the upper end located on the axis of swivel movement of the brake drum, and means for rocking the cam to engage the projections with the shoes to move the latter into engagement with the brake drum, said means including an operating lever having one end pivotally supported on said journal and having a portion intermediate the ends operatively connected to the end of the extension on said cam.

8. In a brake mechanism, a brake drum supported for swivel movement about an up and down axis, brake friction means having spaced ends and located within the brake drum for engagement therewith, a cam mounted within the brake drum for rocking movement about an axis substantially parallel to the axis of rotation of the brake drum and having portions extending between the ends of the friction means for moving the latter outwardly into engagement with the brake drum, said cam further provided with a radially inwardly projecting extension having the inner end located substantially on the axis of swivel movement of the brake drum, and an operating lever mounted for rocking movement about an axis substantially perpendicular to the axis of rotation of the drum and having a portion offset from the latter axis universally connected to the radially inner end of the extension on said cam.

9. In a brake mechanism, a brake drum supported for swivel movement about an up and down axis, brake friction means having spaced ends and located within the brake drum for engagement therewith, a cam mounted within the brake drum for rocking movement in a plane substantially parallel to the plane of rotation of the brake drum and having portions extending between the ends of the friction means for moving said ends outwardly into engagement with the brake drum, said cam further having a radially inwardly projecting extension having the inner end located substantially on the axis of swivel movement of the brake drum, and an operating lever supported for rocking movement about an axis extending radially from the axis of rotation of the brake drum and having a portion offset from the axis of rocking movement thereof engageable with the radially inner end of the extension on the cam for rocking the latter.

10. In a brake mechanism, a brake drum, a kingpin supporting the brake drum for swivel movement about an up and down axis and having a portion at one end offset laterally with respect to said axis, brake friction means having spaced ends and located within the drum for engagement therewith, a cam mounted within the drum for rocking movement in a plane substantially parallel to the plane of rotation of the drum and having portions extending between the ends of the friction means for moving the latter ends outwardly into engagement with the drum, said cam further provided with a radially inwardly projecting extension having the inner end located substantially on the axis of swivel movement of the brake drum, and an operating lever supported for rocking movement on the offset portion of the kingpin and having a portion engageable with the end of the extension on said cam to rock the latter.

11. In a brake mechanism, a brake drum, brake friction means having spaced ends and located within the drum for engagement therewith, an actuator for the brake friction means including a cam mounted for rocking movement in a plane substantially parallel to the plane of rotation of the brake drum and having portions extending between the ends of the brake friction means for moving said ends outwardly into engagement with the drum, an operating lever supported for rocking movement about an axis extending substantially perpendicular to the axis of rotation of the drum and having a radially inwardly opening socket in a portion thereof which is offset from the axis of rocking movement aforesaid, and a radially inwardly projecting extension on the cam extending into said socket and having a sliding engagement therewith.

12. In a brake mechanism, a brake drum, a backing plate for the drum, brake friction means having spaced ends and located within the drum for engagement therewith, a cam supported for rocking movement in a plane substantially parallel to the plane of rotation of the drum between the ends of the friction means for actuating the latter, and an operating lever having one end supported for rocking movement about an axis extending generally radially of the axis of rotation of the drum and having a portion spaced from the latter end toward the opposite end operatively connected to the cam for actuating the latter.

13. In a brake mechanism, a brake drum, a backing plate for the drum having a portion offset laterally in a direction to project into the drum, brake friction means having spaced ends and located within the drum for engagement therewith, a cam supported in the drum for rocking movement between the ends of the friction means in a plane substantially parallel to the plane of rotation of the drum and having a generally radially inwardly extending portion, a pivot pin located within the laterally offset portion of the backing plate and having its axis extending generally radially of the axis of rotation of the brake drum, and an operating lever having one end connected to the pivot pin for swinging movement about the axis of the latter and having a portion spaced from said end toward the opposite end thereof engageable with the radially inwardly projecting portion of the cam for actuating the latter.

FRANK L. MAIN.